(12) United States Patent
Chaubey et al.

(10) Patent No.: US 12,122,530 B2
(45) Date of Patent: Oct. 22, 2024

(54) ENERGY CONSTRAINT MANAGEMENT METHODS AND SYSTEMS

(71) Applicant: HONEYWELL INTERNATIONAL INC., Charlotte, NC (US)

(72) Inventors: Rajesh Chaubey, Bangalore (IN); Gregory Carlucci, Phoenix, AZ (US); Richard Snyder, Phoenix, AZ (US); Michael Jackson, Plymouth, MN (US); Naresh Bandam, Bangalore (IN); Roopa Niveditha Sundara Kulal, Bangalore (IN); Ambika Sure, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 274 days.

(21) Appl. No.: 17/656,128

(22) Filed: Mar. 23, 2022

(65) Prior Publication Data
US 2023/0249842 A1    Aug. 10, 2023

(30) Foreign Application Priority Data

Feb. 4, 2022 (IN) ............................. 202211006048

(51) Int. Cl.
*B64D 43/00* (2006.01)
*B64C 13/16* (2006.01)
*G08G 5/00* (2006.01)

(52) U.S. Cl.
CPC ............. *B64D 43/00* (2013.01); *B64C 13/16* (2013.01); *G08G 5/003* (2013.01)

(58) Field of Classification Search
CPC ........... B64C 13/16; B64C 9/32; B64D 43/00; G08G 5/0021; G08G 5/003; G08G 5/0086; G08G 5/0091; G08G 5/025
See application file for complete search history.

(56) References Cited

U.S. PATENT DOCUMENTS

| 8,180,506 B2 | 5/2012 | Sacle et al. |
| 9,188,978 B2 | 11/2015 | Sacle et al. |
| 9,360,866 B2 | 6/2016 | Gutierrez-Castaneda et al. |
| (Continued) | | |

FOREIGN PATENT DOCUMENTS

EP        2631890 A2    8/2013

*Primary Examiner* — Tyler J Lee
(74) *Attorney, Agent, or Firm* — Lorenz & Kopf LLP

(57) ABSTRACT

Methods and systems are provided for assisting operation of a vehicle to satisfy a downpath energy constraint when a current energy state has deviated from a reference energy state according to a planned route of travel. One method involves identifying an intermediate energy constraint at an intermediate point en route to the downpath waypoint, determining a first segment for satisfying the intermediate energy constraint at the intermediate point from the current energy state using a first configuration, determining a second segment from the intermediate point that satisfies the requested energy constraint at the downpath waypoint using a different configuration, and providing graphical indicia of the recommended path including the first and second segments. The graphical indicia includes a first graphical indication of the first configuration associated with the first segment and a second graphical indication of the second configuration associated with the second segment.

20 Claims, 5 Drawing Sheets

(56) References Cited

U.S. PATENT DOCUMENTS

| | | |
|---|---|---|
| 9,530,321 B2 * | 12/2016 | Deker .................... G05D 1/101 |
| 9,733,103 B2 | 8/2017 | He et al. |
| 10,134,289 B2 | 11/2018 | Moravek et al. |
| 10,139,246 B1 | 11/2018 | Reddy et al. |
| 10,380,901 B2 | 8/2019 | Deker et al. |
| 10,467,912 B2 | 11/2019 | McCullough et al. |
| 2005/0261808 A1 * | 11/2005 | Artini .................... G01C 23/00<br>701/3 |
| 2006/0085101 A1 * | 4/2006 | Berard .................... G01C 23/00<br>701/3 |
| 2010/0023187 A1 | 1/2010 | Gannon et al. |
| 2010/0324812 A1 * | 12/2010 | Sacle .................... G05D 1/0202<br>701/467 |
| 2014/0012436 A1 * | 1/2014 | Coulmeau ............... B64C 19/00<br>701/3 |
| 2017/0243495 A1 | 8/2017 | Moravek et al. |
| 2019/0005827 A1 | 1/2019 | Bauer et al. |
| 2019/0371187 A1 | 12/2019 | Moravek et al. |
| 2020/0160731 A1 | 5/2020 | De Villele et al. |
| 2021/0254997 A1 | 8/2021 | Chaubey et al. |

\* cited by examiner

ENERGY CONSTRAINT MANAGEMENT METHODS AND SYSTEMS

CROSS-REFERENCE TO RELATED APPLICATION

This application claims priority to India Provisional Patent Application No. 202211006048, filed Feb. 4, 2022, the entire content of which is incorporated by reference herein.

TECHNICAL FIELD

The subject matter described herein relates generally to vehicle systems, and more particularly, embodiments of the subject matter relate to aircraft systems and related cockpit displays that facilitate energy management when deviating from a previously-planned trajectory.

BACKGROUND

Aircraft and other vehicles often operate in controlled area where the pilot or vehicle operator is expected to coordinate operation with a controller or other authority for traffic management, safety, efficiency, etc. For example, an air traffic controller (ATC) typically communicates an instruction or a request for pilot action by a particular aircraft within a controlled airspace managed by the ATC. Thereafter, the pilot is responsible for acknowledging the request and confirming performance of the pilot action. However, to ascertain the potential operational impacts of the proposed pilot action and/or the availability of the aircraft to safely execute the requested action, the pilot is required to manually obtain information from various instrument displays and mentally synthesize or assess the information using the pilot's personal experience and judgment. This can be time consuming, inefficient, error prone, and potentially distracting, and ultimately result in a lack of situational awareness with respect to the proposed course of action.

In practice, desirable to operate an aircraft in stable manner when descending and approaching an airport in order to land safely and avoid hard landings or other actions that could increase stress on the aircraft, which may increase maintenance or inspection costs. However, in some scenarios, the ATC may request the pilot utilize a particular altitude constraint, speed constraint, or the like for purposes of managing air traffic, but which could undesirably impact the stability, passenger comfort, operating costs (e.g., by deviating from a cost-efficient or optimal trajectory computed by the flight management system (FMS) that satisfies stability constraints) or other considerations. Not only do pilots lack visibility of the aircraft's performance limitations and corresponding risks or impact of accepting such ATC requests, the ATC also lacks visibility of the aircraft's performance limitations or how a given request could impact downpath performance. Accordingly, it is desirable to improve situational awareness with respect to the energy management, cost, safety and/or other considerations implicated by instructions or requests received in connection with operation in a controlled area. Other desirable features and characteristics will become apparent from the subsequent detailed description and the appended claims, taken in conjunction with the accompanying drawings and this background.

BRIEF SUMMARY

Methods and systems are provided for assisting operation of a vehicle, such as an aircraft, when a current energy state deviates from a reference energy state according to an originally planned route of travel. One method involves obtaining a requested energy constraint for a downpath waypoint, identifying an intermediate energy constraint for the aircraft at an intermediate point en route to the downpath waypoint based at least in part on a flight plan, determining a first flight path segment for satisfying the intermediate energy constraint at the intermediate point from the current energy state of the aircraft, resulting in a first aircraft configuration associated with the first flight path segment, determining a second flight path segment from the intermediate point for satisfying the requested energy constraint associated with the downpath waypoint, resulting in a second aircraft configuration associated with the second flight path segment, wherein the second aircraft configuration is different from the first aircraft configuration, and providing graphical indicia of a recommended flight path comprising the first flight path segment and the second flight path segment, wherein the graphical indicia includes a first graphical indication of the first aircraft configuration associated with the first flight path segment and a second graphical indication of the second aircraft configuration associated with the second flight path segment.

In another embodiment, an apparatus is provided for a computer-readable medium having computer-executable instructions stored thereon that, when executed by a processing system, cause the processing system to identify a requested energy constraint for a downpath waypoint, identify an intermediate energy constraint at an intermediate point en route to the downpath waypoint based at least in part on a planned route of travel for a vehicle, determine a first segment for satisfying the intermediate energy constraint at the intermediate point from a current energy state using a first configuration for the vehicle, determine a second segment from the intermediate point for satisfying the requested energy constraint at the downpath waypoint using a second configuration for the vehicle different from the first configuration for the vehicle, and provide graphical indicia of a recommended path comprising the first segment and the second segment, wherein the graphical indicia includes a first graphical indication of the first configuration associated with the first segment and a second graphical indication of the second configuration associated with the second segment.

In another embodiment, a vehicle system is provided that includes a display device, one or more systems to provide current status information for a vehicle, and a processing system coupled to the display device and the one or more systems to obtain a requested energy constraint for a downpath waypoint of a planned route of travel for the vehicle, identify an intermediate energy constraint at an intermediate point en route to the downpath waypoint based at least in part on the planned route of travel, determine a first segment for satisfying the intermediate energy constraint at the intermediate point based at least in part on the current status information using a first configuration for the vehicle, determine a second segment from the intermediate point for satisfying the requested energy constraint associated with the downpath waypoint using a second configuration for the vehicle, and provide graphical indicia of a recommended path comprising the first segment and the second segment on the display device. The graphical indicia includes a first graphical indication of the first configuration associated with the first segment and a second graphical indication of the second configuration associated with the second segment, and the first configuration is different from the second configuration.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
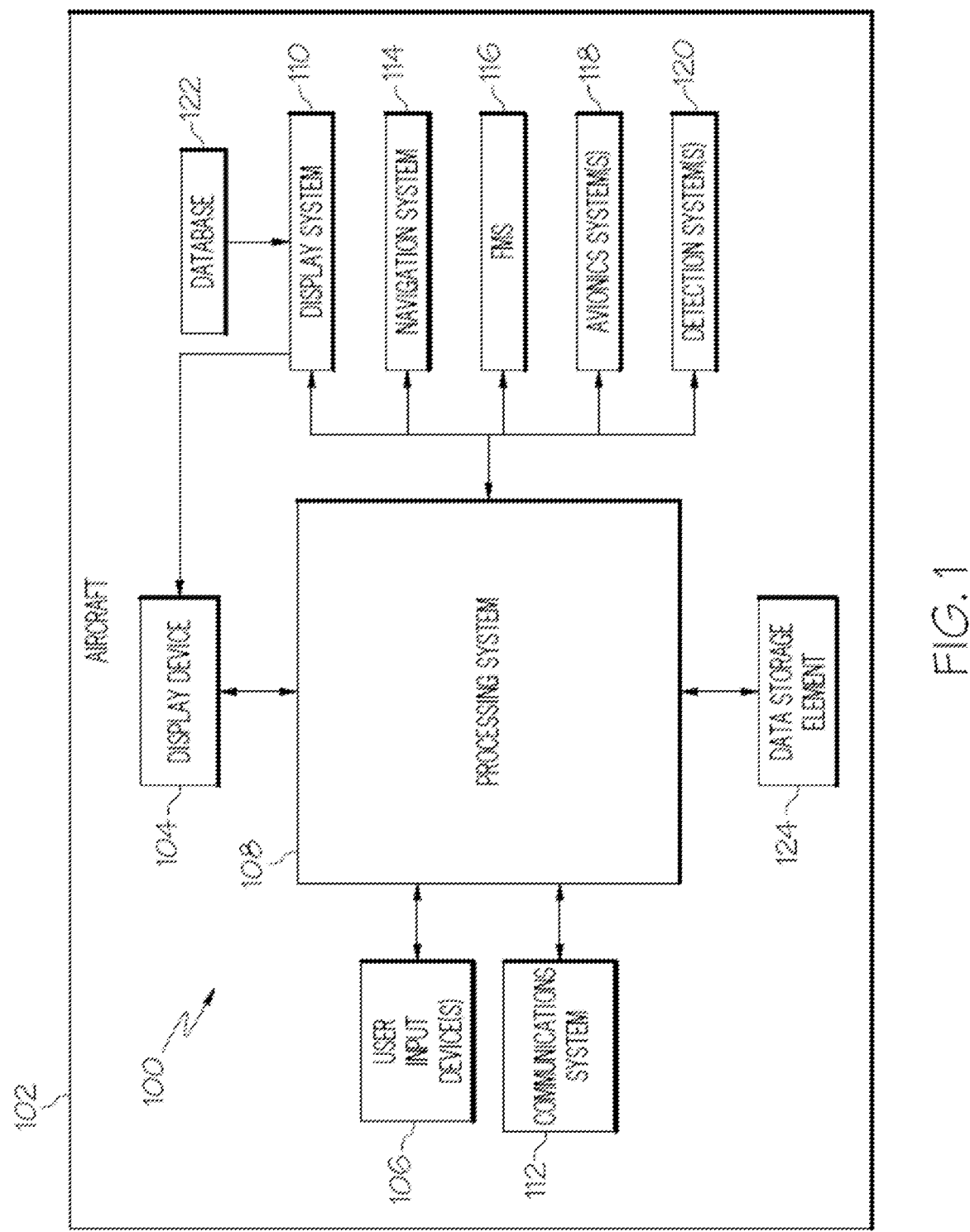
FIG. 1 is a block diagram of a system for an aircraft in an exemplary embodiment.

Embodiments of the subject matter described herein generally relate to systems and methods that facilitate a pilot or other vehicle operator visualizing vehicle capabilities and potential operational impacts of different vehicle configurations or actions to improve situational awareness and decision making with respect to a request issued by an air traffic controller (ATC) or other traffic manager when operating in a controlled area. For example, after the ATC has previously issued clearance commands to the aircraft that caused the aircraft to deviate from a previously-planned flight path that satisfies otherwise applicable constraints (e.g., by holding the aircraft at a particular flight level), the pilot may be unable to ascertain whether or how the aircraft can be operated to intercept or otherwise reengage the previously-planned flight path, or whether or how the aircraft can be operated to achieve a subsequent constraint requested by the ATC. In this regard, rather than requiring manual analysis of the current energy state of the aircraft relative to the originally-planned reference energy state for the current location of the aircraft within the flight plan and determination of potential operational impacts of satisfying a requested constraint, the subject matter described herein determines a recommended trajectory for satisfying the requested constraint and conveys the recommended trajectory to the pilot or other vehicle operator to provide a better understanding of the potential operational impacts of the requested action. Although the subject matter is described herein primarily in an aviation context and potentially with reference to a flight plan, an aircraft procedure, or the like, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to use with aircraft or in an aviation environment.

As described in greater detail below in the context of FIGS. 2-5, in exemplary embodiments, the requested energy constraint (e.g., an altitude, a speed constraint, or the like) for a downpath (or upcoming) waypoint is received or otherwise obtained from the ATC and analyzed to identify a recommended flight path for satisfying the requested energy constraint upon the aircraft traversing or arriving at that downpath waypoint. One or more intermediate energy constraints for the aircraft at one or more corresponding intermediate points between the current aircraft position and the downpath waypoint are identified, determined or otherwise derived using a flight plan for the aircraft, which, in turn, are utilized to determine a recommended flight path that satisfies the intermediate energy constraint(s) en route to satisfying the requested energy constraint at the specified downpath waypoint. The intermediate energy constraint may be realized as any sort of altitude or speed constraint to be satisfied by the aircraft along the previously-planned trajectory or flight path, such as, for example, a minimum altitude constraint, a maximum altitude constraint, a minimum speed constraint, a maximum speed constraint, or the like. In this regard, some intermediate energy constraints may be predefined for or otherwise associated with a particular waypoint of the flight plan (e.g., by setting a particular speed and/or altitude constraint for a given waypoint), while other intermediate energy constraints may be associated with a particular position along the route defined by the flight plan waypoints to be calculated or otherwise derived by the FMS when computing a corresponding flight path or vertical profile for the lateral route defined by the flight plan, where the particular position of the intermediate constraint in the vertical and/or lateral domain is determined based on aerodynamic modeling, aircraft performance limitations or predictions, and/or the like, such as, for example, a deceleration to descent speed limit altitude, a descent speed limit altitude and/or speed constraint (e.g., speed restriction to less than 250 knots below 10,000 feet), a flap extension point, a calibrated airspeed (CAS)/Mach pair altitude and/or the like.

In one or more exemplary embodiments, the intermediate energy constraints are identified or otherwise derived from a previously-planned flight path determined by a flight management system (FMS). The previously-planned flight path includes an altitude profile (or vertical profile) and a speed profile that were calculated or otherwise determined by the FMS to satisfy any applicable altitude, speed and/or stabilization constraints along a route defined by a flight plan. For example, an FMS-computed vertical descent profile may be configured to result in the aircraft arriving at a desired horizontal or lateral ground distance ahead of its destination landing location (e.g., a stabilization distance) according to the flight plan at an altitude, airspeed and aircraft configuration (e.g., a stable energy state) that allow adequate dissipation of the remaining aircraft energy during final approach, touchdown and rollout. In some embodiments, one or more of the intermediate constraints are defined by an aircraft manufacturer, an airline or aircraft operator, a standards organization or other regulatory body, an aircraft procedure (e.g., an approach procedure, a departure procedure, an arrival route, and/or the like) or the like, where the altitude profile and speed profile determined by the FMS satisfy those predefined constraints while also satisfying any other applicable altitude, speed, and/or stabilization constraints. In one or more embodiments, the altitude and speed profiles computed by the FMS may also be optimized in accordance with a cost function or otherwise configured to achieve a desired cost index value. The altitude and speed profiles computed by the FMS may also be configured to satisfy one or more required time of arrival (RTA) constraints.

In response to receiving a requested energy constraint for a specified waypoint of the flight plan, a recommended flight path for satisfying the requested energy management constraint at the specified waypoint while also satisfying the intermediate energy constraints associated with the previously-planned reference trajectory for the aircraft between the current location of the aircraft and the specified waypoint. The recommended flight path is incrementally constructed forward from the current aircraft state as a sequence of segments in a piecewise manner that satisfy the intermediate energy constraints, with the final segment being configured to satisfy the requested energy management constraint upon arrival at the specified waypoint. Each segment of the recommended flight path is defined by an altitude profile and a corresponding speed profile that are configured to achieve the next energy management constraint using the appropriate drag configuration(s) for the segment. In this regard, when the drag configuration of the aircraft at the start of the respective segment is incapable of achieving an altitude and speed profile that satisfying the next energy management constraint, the drag configuration of the aircraft is incrementally increased before re-optimizing the flight path angle and the speed profile for that segment using the increased drag configuration until arriving at an altitude and speed profile that satisfy the next energy management constraint. Thus, the resulting recommended flight path for satisfying the requested energy management constraint at the specified waypoint is defined by a sequence of flight path segments and corresponding altitude profiles, speed profiles, and drag configurations from the current aircraft location to the specified waypoint that satisfy the intermediate energy constraint(s) at corresponding intermediate point(s) en route to the specified waypoint.

In exemplary embodiments, graphical indicia of the recommended flight path and corresponding aircraft configurations for satisfying the intermediate energy constraint(s) associated with the previously-planned reference trajectory en route to satisfying the requested energy constraint at the specified waypoint are provided to the pilot, thereby allowing the pilot to visualize and understand the operational impact or significance of the requested energy constraint with respect to the aircraft's ability to satisfy other constraints to maintain stability, minimize costs and/or the like. This improved situational awareness helps the pilot better respond to commands or requests issued by the ATC, as well as identify which aircraft configurations (or sequences thereof) should be utilized to achieve the desired operational objective(s). For example, rather than accepting an ATC request with limited situational awareness that could undesirably impact some aspect of aircraft operation, a pilot may utilize the improved situational awareness provided by the recommended trajectory to negotiate with the ATC and achieve an outcome that maintains safety and reduces costs while also reducing pilot workload with respect to managing ATC clearance instructions and corresponding ATC-requested constraints.

When a flight path for satisfying the intermediate energy constraint(s) en route to satisfying the requested energy constraint at the specified waypoint is unable to be identified, graphical indicia may be provided that indicate that the requested energy constraint is not achievable, thereby providing the pilot with situational awareness to reject the ATC request or otherwise negotiate with the ATC to arrive a satisfactory constraint that can be achieved by the aircraft. In some implementations, when the requested energy constraint at the specified waypoint is not achievable, a modified flight path recommendation is determined using an energy constraint with another waypoint downpath of the previous specified waypoint as an updated target energy constraint for the recommended flight path. In this regard, the final segment of the modified flight path recommendation includes an altitude and speed profile from the preceding intermediate constraint to the updated target energy constraint at the next downpath waypoint of the flight plan following the waypoint from the initial ATC request. In this regard, the waypoints and corresponding constraints downpath of the initially requested waypoint and constraint provided by the ATC may be incrementally analyzed until arriving at a modified flight path recommendation from the current aircraft state that satisfies intermediate constraints en route to satisfying the target energy constraint associated with that downpath waypoint. Thereafter, graphical indicia of the modified flight path recommendation and corresponding aircraft configurations for satisfying the intermediate energy constraint(s) en route to satisfying an updated target constraint at a further downpath waypoint is provided to the pilot, thereby allowing the pilot to visualize and understand what the aircraft's capability is for intercepting or otherwise reengaging the previously-planned flight path according to the flight plan. The pilot can then negotiate or otherwise coordinate with the ATC on the basis of this information to arrive at an agreement on a constraint for a downpath waypoint that satisfies the pilot's objective(s) with respect to operating the ownship aircraft (e.g., safety, passenger comfort, costs, etc.) more expeditiously while also allowing the ATC to maintain control and traffic separation within the airspace.

By virtue of the subject matter described herein, the time required for a pilot to ascertain whether they are able to take a proposed course of action, respond to the ATC, co-pilot, or other individual making the request, and initiate or request modification to the proposed course of action may be reduced. Safety is also improved by providing the pilot with better awareness of how to execute the proposed course of action and how the prospective operation of the aircraft will impact the ability to satisfy upcoming constraints, which reduces the likelihood of cognitive shortcuts, inaccurate assessments, or other mental errors (e.g., accepting an ATC clearance request that is not achievable or otherwise undesirably impacts aircraft operation). It should be noted that in addition to analyzing ATC requests, the subject matter described herein may be utilized independent of ATC requests or other external requests or commands. For example, a pilot considering whether to modify or alter future operation of the aircraft at his or her own volition may manually input one or more downpath constraints that the pilot would like to satisfy (e.g., a particular speed and/or altitude at a particular waypoint, and/or the like), with a corresponding graphical indicia of a recommended flight path for achieving those downpath constraints (or an indication of an inability to achieve those downpath constraints) being provided to the pilot. In this regard, as described in greater detail below, some embodiments may provide graphical user interface (GUI) elements that are manipulable by a pilot to define or otherwise limit the potential aircraft configurations available for utilization in determining a recommended flight path, thereby allowing the pilot to proactively control what drag configurations are or are not utilized.

FIG. 1 depicts an exemplary embodiment of a system 100 which may be located onboard a vehicle, such as an aircraft 102, and configurable to support the constraint management processes and related tasks, functions and/or operations described herein. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below. In various embodiments, the display device 104 may be realized as a multifunction control display unit (MCDU), cockpit display device (CDU), primary flight display (PFD), navigation display, or any other suitable multifunction monitor or display suitable for displaying various symbols and information described herein. The display device 104 may be configured to support multi-colored or monochrome imagery, and could include or otherwise be realized using a liquid crystal display (LCD), a light emitting diode (LED) display, an organic light emitting diode (OLED) display, a heads-up display (HUD), a heads-down display (HDD), a plasma display, a projection display, a cathode ray tube (CRT) display, or the like.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

In some embodiments, the user input device 106 is realized as a tactile user input device capable of receiving free-form user input via a finger, stylus, pen, or the like. Tactile user input may be received or detected using an array of sensors that are configured to detect contact or proximity to a surface using any number of different technologies (e.g., resistive, capacitive, magnetic, acoustic, optical, infrared and/or the like) which are not germane to this disclosure. In one or more exemplary embodiments, the tactile user input device 106 is integrated with an instance of a display device 104 to provide a touchscreen, that is, an array of sensors arranged adjacent or proximate to an electronic display that are configured to detect contact to the surface of the display and generate corresponding output signals indicative of coordinate locations on the display that were touched or otherwise contacted by a user.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, vertical profile displays or vertical situation displays, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

As described in greater detail below, in one or more exemplary embodiments, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in one or more exemplary embodiments, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in one or more exemplary embodiments, the navigation system 114 includes inertial reference sensors capable of obtaining or otherwise determining the attitude or orientation (e.g., the pitch, roll, and yaw, heading) of the aircraft 102 relative to Earth.

In one or more exemplary embodiments, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag (EFB) that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
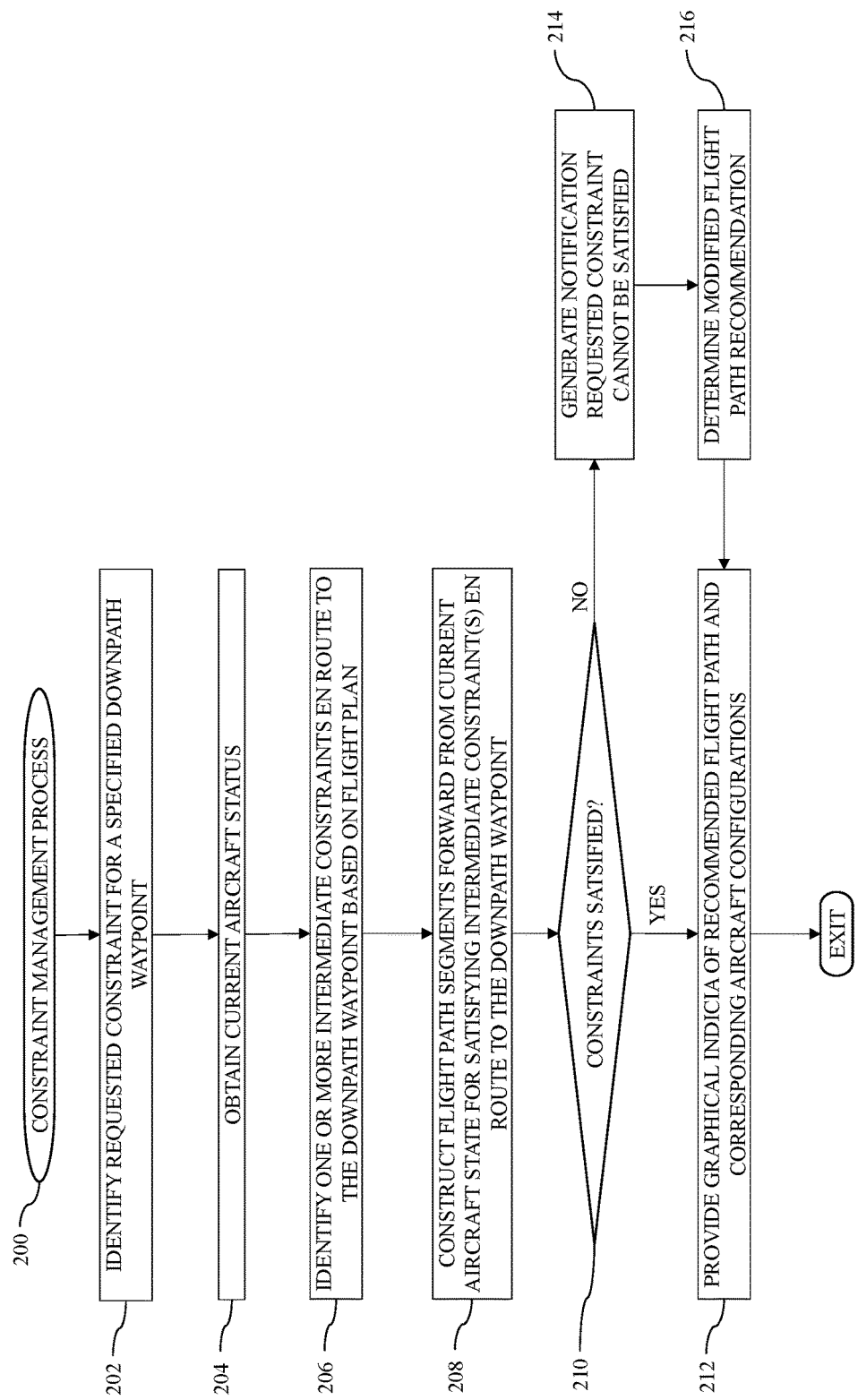
FIG. 2 is a flow diagram of a constraint management process suitable for implementation by the aircraft system of FIG. 1 in one or more exemplary embodiments.

FIG. 2 depicts an exemplary embodiment of a constraint management process 200 suitable for implementation by an aircraft system or display system to provide graphical indicia of a recommended flight path for satisfying a constraint associated with a downpath (or upcoming) waypoint. The various tasks performed in connection with the illustrated process may be implemented using hardware, firmware, software executed by processing circuitry, or any combination thereof. In practice, portions of the constraint management process 200 may be performed by different elements of the aircraft system 100, such as, for example, the display device 104, the user input device 106, the processing system 108 and/or one or more onboard avionics systems 110, 112, 114, 116, 118, 120. It should be appreciated that the constraint management process 200 may include any number of additional or alternative tasks, the tasks need not be performed in the illustrated order and/or the tasks may be performed concurrently, and/or the constraint management process 200 may be incorporated into a more comprehensive procedure or process having additional functionality not described in detail herein. Moreover, one or more of the tasks shown and described in the context of FIG. 2 could be omitted from a practical embodiment of the constraint management process 200 as long as the intended overall functionality remains intact.

The constraint management process 200 initializes by identifying or otherwise obtaining a requested constraint for a downpath waypoint along the flight plan being flown by the aircraft (task 202). In some embodiments, a pilot or other user utilizes a user input device 106 to indicate a desire to initiate the constraint management process 200 (e.g., by selecting a button or similar graphical user interface (GUI) element associated with the constraint management functionality on a GUI display presented on the display device 104), which, in turn, results in the processing system 108 generating one or more combo boxes, text boxes, list boxes, drop-down menus, radio buttons or other GUI elements that allow the user to identify the downpath waypoint of interest where a requested energy constraint is to be satisfied along with the desired value (or range thereof) for the requested energy constraint to be satisfied by the aircraft 102 upon arrival or traversal of the identified waypoint. In other embodiments, the values for the requested energy constraint and corresponding downpath waypoint may be automatically identified based on analysis of communications obtained via a communications system 112 (e.g., audio communications from ATC, data link communications, and/or the like). For example, as described in U.S. patent application Ser. No. 15/982,518, ATC communications received via the communications system 112 may be transcribed into corresponding textual representations, which, in turn, may be analyzed to identify and extract one or more operational subjects, operational parameters values, and/or aircraft actions associated with the aircraft 102. In this regard, the requested energy constraint and downpath waypoint associated with an ATC command or request may automatically be identified by the constraint management process 200 as the input for generating a constraint management GUI display corresponding to the ATC communication.

The constraint management process 200 also identifies or otherwise obtains current status information characterizing the current operating state of the aircraft (task 204). In this regard, the current status information generally represents the instantaneous, real-time or most recent available values for one or more parameters that quantify the current operation of the aircraft 102. For example, the processing system 108 may obtain (e.g., from FMS 116, navigation system 114 and/or other avionic systems 118) one or more of the following: the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration, the current landing gear configuration, and/or the like). Thus, the current values for the different operational state parameters define the current operating state of the aircraft 102. In some embodiments, the constraint management process 200 also identifies or otherwise obtains information characterizing the current operating environment for the aircraft. For example, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like). In various embodiments, the constraint management process 200 also identifies or otherwise obtains forecasted or real-time meteorological information associated with navigational reference points or geographic areas relevant to the upcoming trajectory of the aircraft (e.g., the downpath waypoints of the flight plan).

Still referring to FIG. 2, the constraint management process 200 identifies or otherwise obtains one or more intermediate constraints for the aircraft between the current aircraft position and the specified downpath waypoint based on the flight plan currently being flown (task 206). In this regard, the constraint management process 200 identifies the different constraints that exist or would otherwise occur along the planned route between the current location of the aircraft and the downpath waypoint that were previously utilized and/or calculated by the FMS 116 when determining the originally-planned flight path for the aircraft 102, such as, for example, altitude and/or speed constraints associated with intermediate waypoints between the current aircraft location and the downpath waypoint associated with the request, a deceleration to descent speed limit altitude, a descent speed limit altitude and/or speed constraint (e.g., speed restriction to less than 250 knots below 10,000 feet), flap extension points, a calibrated airspeed (CAS)/Mach pair altitude and/or the like.

After identifying one or more intermediate constraint(s) to be satisfied en route to the downpath waypoint, the constraint management process 200 continues by incrementally constructing flight path segments forward from the current aircraft state to the intermediate constraint(s) in sequential order until reaching the location of the downpath waypoint (task 208). In exemplary embodiments, for each flight path segment, the constraint management process 200 utilizes an initial descent strategy corresponding to the current drag configuration of the aircraft at the start of the segment and determines the optimal flight path angle and speed profile from the current speed and the current altitude of the aircraft at the current location of the aircraft that results in the aircraft satisfying the intermediate constraint at the lateral location along the flight plan route associated with that intermediate constraint. For example, the FMS 116 may utilize one or more aerodynamic models to model or otherwise predict the performance of the aircraft along the planned lateral trajectory as a function of the current aircraft gross weight at the start of the segment, the current fuel remaining at the start of the segment, any forecasted and/or expected meteorological conditions along the segment, and then varies or otherwise optimizes the vertical and speed profiles for the segment to achieve the intermediate constraint. For example, the FMS 116 may include a trajectory generation system (or trajectory generator), which generally represents a process, service, software or firmware component that is executed, generated or otherwise implemented by the FMS 116 to compute, calculate, or otherwise determine a planned lateral trajectory for the aircraft for flying the flight plan defined by the various constraints that define a flight plan to be flown by an aircraft along with corresponding vertical profiles and speed profiles for the aircraft that are configured to satisfy the altitude, speed, stabilization, and/or other constraints associated with the flight plan by using aerodynamic modeling and optimizing the vertical profile and the speed profile to minimize the value of a cost function or otherwise achieve a desired cost index, such that the resulting vertical profile and speed profile determined by the trajectory generator represent the optimal manner in which the planned lateral trajectory should be flown to achieve the desired tradeoffs between fuel consumption, travel time, noise, and/or the like. Further examples of determining optimal flight path angles and speed profiles are described in U.S. patent application Ser. No. 17/127,504.

When the constraint management process 200 is able to construct a sequence of flight path segments that satisfy the intermediate constraints while also satisfying the requested constraint at the downpath waypoint, the constraint management process 200 determines the requested constraint can be satisfied and generates or otherwise provides graphical indicia of the recommended flight path and corresponding aircraft configurations associated with the constructed flight path segments for satisfying the requested constraint (tasks 210, 212). Accordingly, the pilot may utilize the depicted recommended flight path for guidance when operating the aircraft en route to the downpath waypoint. When the constraint management process 200 is unable to identify a flight path segment that satisfies at least one of the intermediate constraint(s) or the requested constraint at the downpath waypoint, the constraint management process 200 determines the requested constraint cannot be satisfied and generates or otherwise provides a corresponding notification to the pilot (task 214). Thus, the pilot is provided situational awareness that may be utilized to reject the request or otherwise negotiate the requested constraint with the ATC. As described in greater detail below, in one or more exemplary embodiments, the constraint management process 200 calculates or otherwise determines a modified flight path recommendation for satisfying an alternative constraint associated with another downpath waypoint and generates or otherwise provides graphical indicia of the modified flight path recommendation and corresponding aircraft configurations associated with the constructed flight path segments for satisfying the alternative downpath constraint (task 212, 216). In this regard, the modified flight path recommendation provides situational awareness of what alternative downpath constraints the aircraft may be capable of achieving to facilitate negotiation with the ATC.

Still referring to FIG. 2, in one or more exemplary embodiments, the constraint management process 200 incrementally constructs flight path segments forward from the current aircraft state to the intermediate constraint(s) in sequential order until reaching the location of the downpath waypoint (task 208) by progressively and incrementally increasing the drag configuration of the aircraft until arriving at an aircraft configuration that satisfies the constraint defining the endpoint of the respective flight path segment. In this regard, when the FMS 116 is unable to satisfy an intermediate constraint using the initial descent strategy maintaining the current aircraft configuration, the iteratively repeats the step of determining the optimal flight path angle and speed profile by incrementally increasing the drag configuration of the aircraft until arriving at a flight path that satisfies the intermediate constraint. For example, starting from an initial aircraft configuration of zero usage of speedbrakes along the segment, the FMS 116 initially attempts to determine an optimal flight path angle and speed profile from the current speed and the current altitude of the aircraft at the current location of the aircraft that results in the aircraft satisfying the intermediate constraint at the lateral location along the flight plan route associated with that intermediate constraint without using speedbrakes. If the aircraft is unable to satisfy the intermediate constraint without speedbrakes, the FMS 116 incrementally increases the aircraft drag configuration to utilize another descent strategy of half speedbrakes along the segment, where the FMS 116 then attempts to determine an optimal flight path angle and speed profile from the current speed and the current altitude of the aircraft at the current location of the aircraft that results in the aircraft satisfying the intermediate constraint at the lateral location along the flight plan route associated with that intermediate constraint while using half speedbrakes along the respective segment. If the aircraft is unable to satisfy the intermediate constraint using half speedbrakes, the FMS 116 incrementally increases the aircraft drag configuration to utilize another descent strategy of full speedbrakes along the segment, where the FMS 116 then attempts to determine an optimal flight path angle and speed profile from the current speed and the current altitude of the aircraft at the current location of the aircraft that results in the aircraft satisfying the intermediate constraint at the lateral location along the flight plan route associated with that intermediate constraint while using full speedbrakes along the respective segment. If the aircraft is still unable to satisfy the intermediate constraint using full speedbrakes, the FMS 116 incrementally increases the aircraft drag configuration to utilize another descent strategy of maximizing descent speed with full speedbrakes along the segment, where the FMS 116 then attempts to determine a flight path angle and speed profile from the current speed and the current altitude of the aircraft at the current location of the aircraft that maximizes the descent speed while using full speedbrakes along the respective segment. In one or more embodiments, when the maximum descent speed strategy fails to satisfy the constraint that defines the endpoint of the respective segment, the FMS 116 determines the requested constraint cannot be satisfied and provides a corresponding notification (e.g., tasks 210, 214).

In yet other embodiments, rather than progressively increasing the speedbrakes or other drag configuration of the aircraft, the constraint management process 200 incrementally constructs flight path segments forward from the current aircraft state using a fixed aircraft configuration that is specified by a user. For example, a constraint management GUI display may include a drop-down menu, radio buttons, or similar GUI element(s) that are manipulable by a pilot to select or otherwise indicate what descent strategy and corresponding aircraft configuration should be utilized when attempting to satisfy a requested constraint. In this regard, a pilot may select a desired speedbrake strategy to be utilized that represents the maximum amount of speedbrakes that the pilot would like to utilize (e.g., to minimize passenger discomfort or the like). For example, the pilot may specify a desire to utilize half speedbrakes for the entire flight path from the current aircraft location to the downpath waypoint, rather than having to utilize additional configuration changes and/or increased drag while en route (e.g., zero speedbrakes followed by one or more full speedbrake segments). In such embodiments, the FMS 116 constructs the initial segment forward from the current aircraft location and altitude using the user-specified aircraft configuration and determines the optimal flight path angle and speed profile that satisfies the nearest intermediate constraint. For the following segments, the FMS 116 similarly constructs the respective segment forward to the next constraint by optimizing the flight path angle and speed profile using the user-specified aircraft configuration to satisfy the next constraint until reaching the requested constraint at the specified downpath waypoint. In this regard, when the user-specified aircraft configuration strategy fails to satisfy one or more of the constraints, the FMS 116 determines the requested constraint cannot be satisfied and provides a corresponding notification (e.g., tasks 210, 214).

Figure 3:
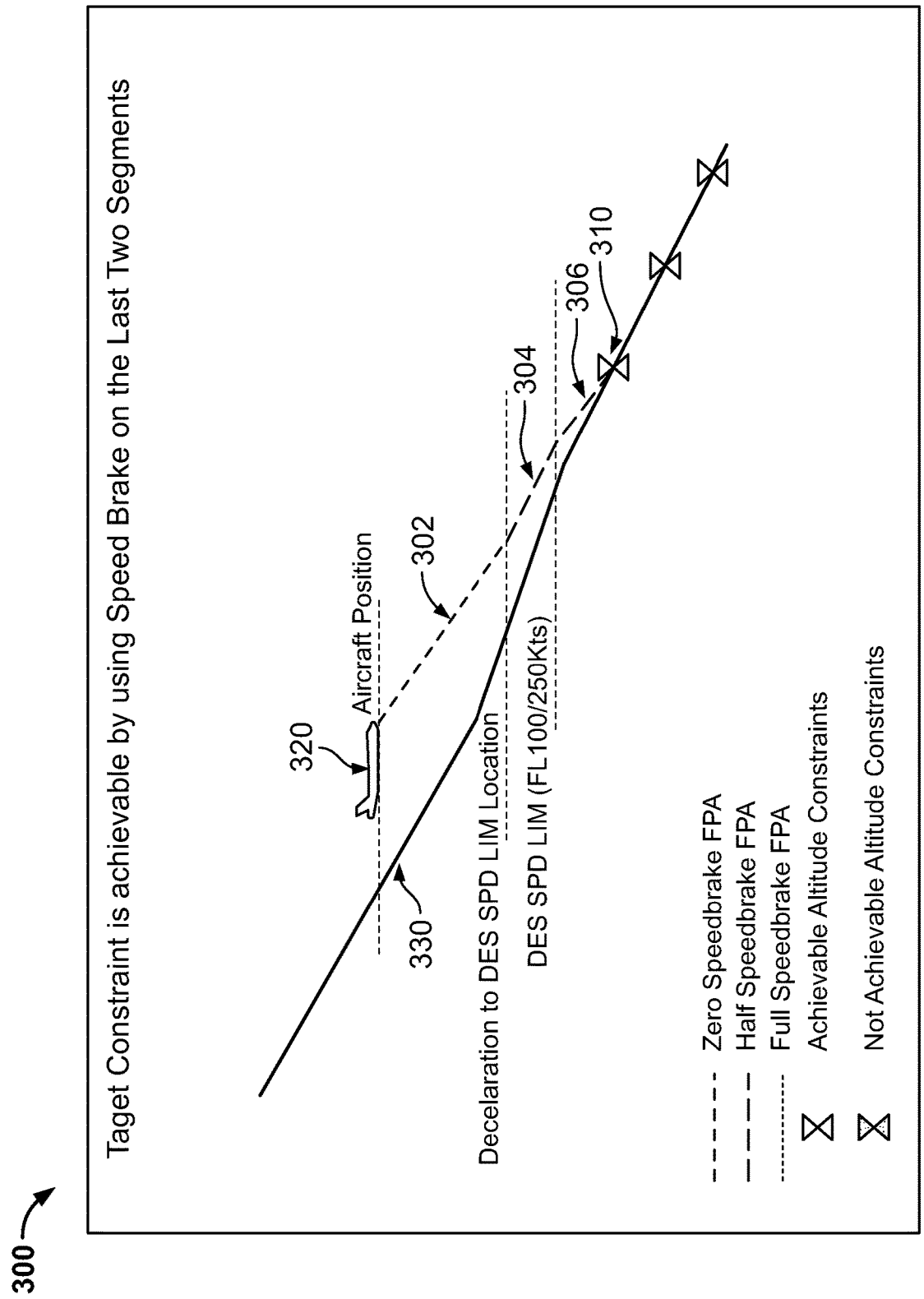
FIGS. 3-5 depict exemplary constraint management graphical user interface (GUI) displays suitable for presentation on a display device onboard the aircraft in the system of FIG. 1 in connection with the constraint management process of FIG. 2 in accordance with one or more embodiments.

FIG. 3 depicts an exemplary constraint management GUI display 300 suitable for presentation in connection with the constraint management process 200 of FIG. 2. The constraint management GUI display 300 includes a graph depicting a graphical representation of a vertical profile for a recommended flight path defined by flight path segments 302, 304, 306 from the current aircraft altitude at the current aircraft location (represented by aircraft symbology 320) to a requested altitude constraint at a downpath waypoint 310. In the illustrated embodiment, the constraint management GUI display 300 also includes a graphical representation of the optimal vertical profile 330 for the flight plan that was previously computed and optimized by the FMS 116. In this regard, FIG. 3 depicts a scenario where the current energy state of the aircraft has deviated from reference energy state according to the originally-planned vertical profile 330, for example, in response to the ATC having previously issued a request to hold the aircraft high and delay descent. Thereafter, the ATC may issue a request to the aircraft to descent from the current aircraft state after being held high to rejoin the flight plan at a requested altitude constraint associated with the downpath waypoint 310. For example, the downpath waypoint 310 could be part of an approach or arrival procedure to be flown by the aircraft en route to landing at a particular runway at the particular destination airport, where the ATC issues a request to descend to an altitude constraint specified by that procedure.

Based on the altitude difference between the current aircraft altitude and the target downpath aircraft altitude corresponding to the request associated with the downpath waypoint 310, the FMS 116 and/or the constraint management process 200 determines that the aircraft 102 will traverse the intermediate constraints of the deceleration to descent speed limit altitude and then the descent speed limit altitude before arrival at the downpath waypoint 310 based on the constraints associated with or otherwise utilized by the FMS 116 to generate the trajectories corresponding to the originally-planned vertical profile 330 (e.g., task 206). The FMS 116 and/or the constraint management process 200 constructs the initial flight path segment 302 forward from the current aircraft altitude and the current aircraft location by optimizing flight path angle and the speed profile using the current aircraft configuration of zero speedbrakes to satisfy the deceleration to descent speed limit altitude. After satisfying the deceleration to descent speed limit altitude, the FMS 116 and/or the constraint management process 200 incrementally constructs the next flight path segment 304 forward from the endpoint of the initial flight path segment 302 (e.g., the expected aircraft location upon reaching the deceleration to descent speed limit altitude) by optimizing flight path angle and the speed profile using the current aircraft configuration of zero speedbrakes to satisfy the descent speed limit altitude (e.g., descent speed less than or equal to 250 knots at an altitude less than or equal to 10,000 feet).

After satisfying the descent speed limit altitude, the FMS 116 and/or the constraint management process 200 incrementally constructs the final flight path segment 306 forward from the endpoint of that intermediate flight path segment 304 (e.g., the expected aircraft location upon reaching the descent speed limit altitude) by optimizing flight path angle and the speed profile using the current aircraft configuration of zero speedbrakes at the start of the respective to satisfy the requested altitude constraint at the downpath waypoint 310. In this regard, FIG. 3 depicts a scenario where the FMS 116 and/or the constraint management process 200 is unable to determine a flight path angle and speed profile that satisfies the requested altitude constraint at the downpath waypoint 310 using the zero speedbrake aircraft configuration. Accordingly, the FMS 116 and/or the constraint management process 200 progressively and incrementally increases the drag configuration from the zero speedbrake aircraft configuration to the half speedbrake aircraft configuration and repeats the step of attempting to determine flight path angle and speed profile that satisfies the requested altitude constraint at the downpath waypoint 310. In this regard, the FMS 116 and/or the constraint management process 200 determines the final flight path segment 306 by optimizing flight path angle and the speed profile using the half speedbrake aircraft configuration from the endpoint of the intermediate flight path segment 304 (e.g., the expected aircraft location upon reaching the descent speed limit altitude).

After determining a recommended flight path that satisfies the requested altitude constraint at the downpath waypoint 310, the constraint management process 200 generates or otherwise provides the graphical representation of the recommended flight path on the constraint management GUI display 300 that includes graphical representations of the respective flight path segments 302, 304, 306 that make up the recommended flight path. In this regard, the graphical representation of a respective flight path segment 302, 304, 306 convey the optimal or recommended vertical profile for the aircraft to follow during execution of the respective flight path segment 302, 304, 306. Additionally, the constraint management GUI display 300 includes graphical indication of the corresponding aircraft configuration associated with each of the respective flight path segments 302, 304, 306. In the illustrated embodiments, the respective flight path segments 302, 304, 306 are rendered or otherwise displayed using different visually distinguishable graphical characteristics that indicate the different aircraft configurations associated therewith. For example, the initial and intermediate flight path segments 302, 304 associated with a zero speedbrake aircraft configuration may be rendered using a color, line style, line width and/or the like that is associated with or is otherwise designated as indicating a zero speedbrake configuration, while the final flight path segment 306 is rendered using a different color, line style, line width and/or the like that is associated with or is otherwise designated as indicating half speedbrake configuration. Thus, the graphical representations of the flight path segments 302, 304, 306 may concurrently convey both the recommended vertical profile to be flown along a given segment while en route to satisfying the requested downpath constraint as well as the recommended speedbrake strategy or aircraft configuration to be utilized while flying that respective segment.

Still referring to FIG. 3, the pilot may utilize the constraint management GUI display 300 provided in connection with the constraint management process 200 to negotiate with the ATC regarding the requested altitude for the downpath waypoint 310. For example, if the pilot prefers not to utilize speedbrakes, the pilot may request a higher altitude for the downpath waypoint 310 or another course of action for the ATC. The pilot may also apprise the ATC of the aircraft configurations required to comply with the original request to facilitate improved situational awareness by the ATC of the aircraft's capabilities. Thus, by virtue of the constraint management process 200 and the constraint management GUI display 300, the pilot and ATC may negotiate a strategy that maintains the desired control and separation within the airspace while also accounting for the pilot's objectives with improved situational awareness.

Figure 4:
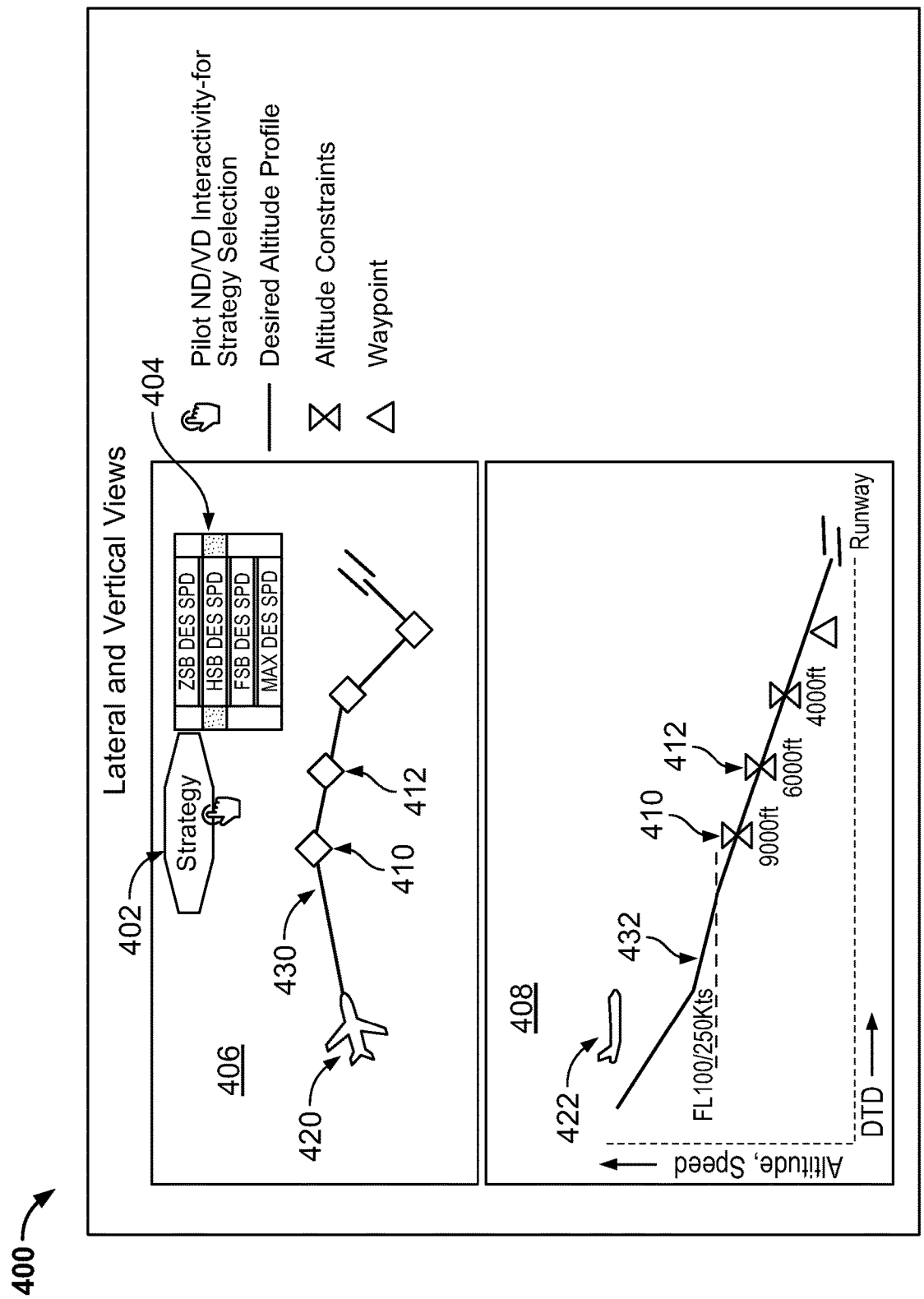
Figure 5:
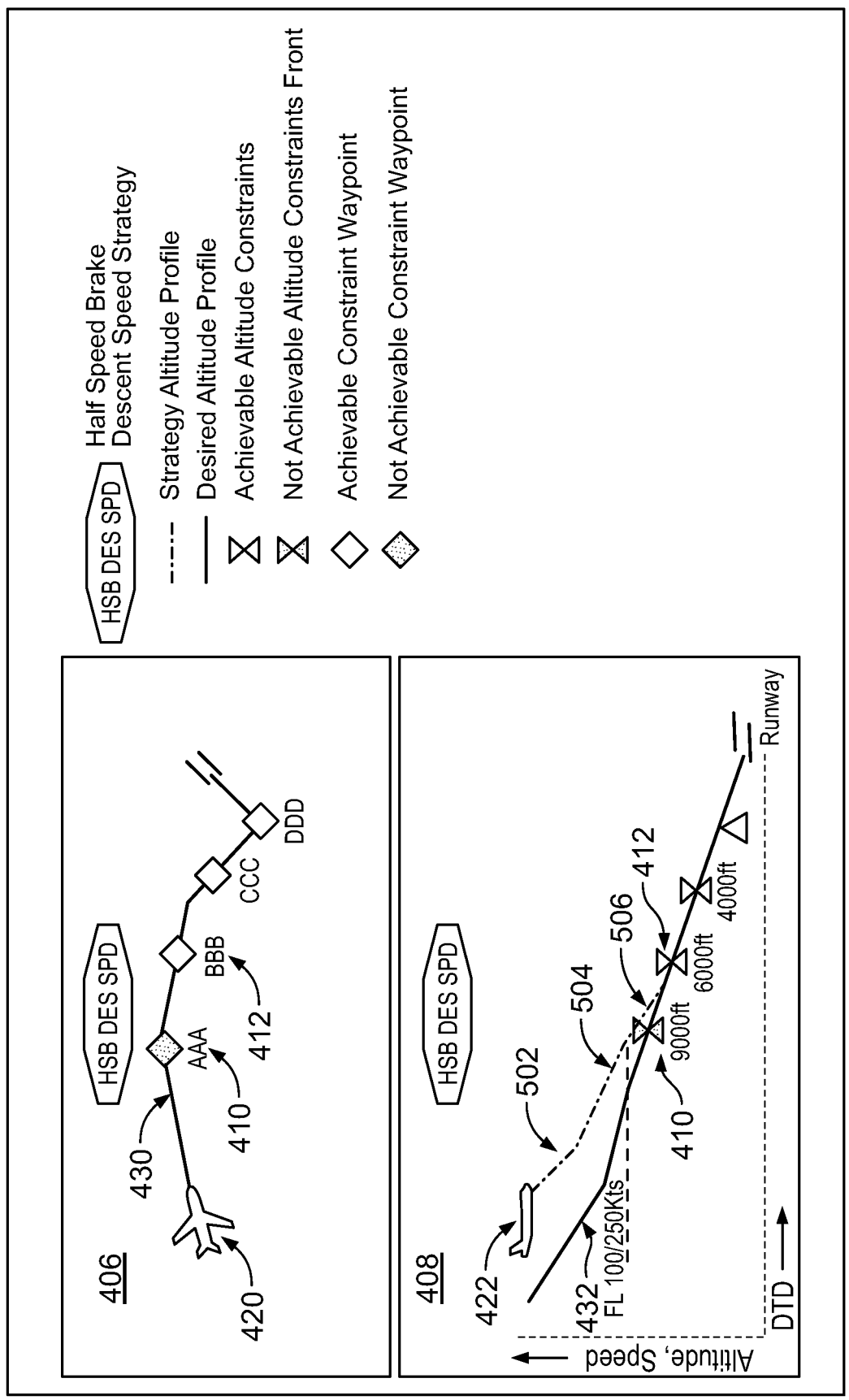

FIGS. 4-5 depict a sequence of exemplary constraint management GUI displays 400, 500 suitable for presentation in connection with the constraint management process 200 of FIG. 2. In this regard, FIGS. 4-5 depict an embodiment where the constraint management GUI display 400 includes a GUI element 402 that is manipulable by the pilot or other user to specify the particular aircraft configuration to be utilized when attempting to satisfy a requested constraint. The constraint management GUI display 400 includes a lateral view region 406 that includes first aircraft symbology 420 that provides a graphical representation of the current lateral location of the aircraft with respect to a graphical representation 430 of the originally-planned lateral route according to the flight plan along with a vertical view region 408 that includes first aircraft symbology 422 that provides a graphical representation of the current altitude of the aircraft at the current lateral location of the aircraft with respect to a graphical representation 432 of the originally-planned vertical profile for the lateral route defined by the flight plan. In the illustrated embodiment, in response to selection of the strategy selection GUI element 402, a menu or list 404 of potential aircraft configuration strategies is provided that allows the pilot or other user to select the desired aircraft configuration strategy from among the different potential strategies that could otherwise be utilized by the constraint management process 200. In this regard, FIGS. 4-5 depict a scenario where the pilot or other user selects the half speedbrake descent strategy (HSB DES SPD) for the constraint management process 200, where the state of the strategy selection GUI element 402 is dynamically updated to reflect the selected half speedbrake descent strategy as depicted in FIG. 5.

FIG. 5 depicts an updated state of the constraint management GUI display 400 in response to a requested altitude constraint (e.g., 9000 feet) at a downpath waypoint 410. In this regard, FIG. 5 depicts a scenario where the constraint management process 200 is unable to determine a recommended flight path that satisfies the requested altitude constraint at the specified waypoint 410 (e.g., task 210). As described above, the constraint management process 200 provides a graphical indication or other user notification that the requested altitude constraint cannot be satisfied (e.g., task 214), for example, by rendering the graphical representation of the specified downpath waypoint 410 using a color (e.g., yellow) or other visually distinguishable graphical characteristic that indicates that the aircraft cannot achieve the requested altitude constraint using the selected half speedbrake descent strategy. The constraint management GUI display 500 also includes a graphical representation of a modified flight path recommendation that includes flight path segments 502, 504, 506 that are configured to satisfy an altitude constraint associated with the next downpath waypoint 412 using the selected half speedbrake descent strategy. In this regard, the next downpath waypoint 412 is rendered using a different color (e.g., green) or other visually distinguishable graphical characteristic that indicates that the aircraft is capable of achieving the requested altitude constraint associated with that waypoint 412 using the selected half speedbrake descent strategy.

In a similar manner as described above, to generate the modified flight path recommendation, the FMS 116 and/or the constraint management process 200 identifies the intermediate constraints of the deceleration to descent speed limit altitude and the descent speed limit altitude as intermediate constraints to be traversed based on the altitude difference between the current aircraft altitude and the target downpath aircraft altitude corresponding to the request associated with the downpath waypoint 410. The FMS 116 and/or the constraint management process 200 constructs the initial flight path segment 502 forward from the current aircraft altitude and the current aircraft location by optimizing flight path angle and the speed profile using the selected aircraft configuration of half speedbrakes to satisfy the deceleration to descent speed limit altitude. After satisfying the deceleration to descent speed limit altitude, the FMS 116 and/or the constraint management process 200 incrementally constructs the next flight path segment 504 forward from the endpoint of the initial flight path segment 502 (e.g., the expected aircraft location upon reaching the deceleration to descent speed limit altitude) by optimizing flight path angle and the speed profile using the selected aircraft configuration of half speedbrakes to satisfy the descent speed limit altitude.

To arrive at the final flight path segment 506 of the modified flight path recommendation, the FMS 116 and/or the constraint management process 200 initially attempts to construct the flight path segment from the endpoint of the preceding flight path segment 504 to the requested altitude constraint (e.g., 9000 feet) for the downpath waypoint 410 using the selected aircraft configuration of half speedbrakes. When the FMS 116 and/or the constraint management process 200 is unable to achieve the requested altitude constraint for the downpath waypoint 410 using the selected aircraft configuration of half speedbrakes, the determines the modified flight path recommendation by selecting or otherwise identifying the next downpath waypoint 412 of the flight plan and the corresponding altitude associated with the next downpath waypoint 412 (e.g., 6000 feet) according to the originally-planned vertical profile for the flight plan. Thereafter, the FMS 116 and/or the constraint management process 200 attempts to construct the flight path segment from the endpoint of the preceding flight path segment 504 to the associated altitude constraint (e.g., 6000 feet) for the next downpath waypoint 410 using the selected aircraft configuration of half speedbrakes. In this regard, the constraint management process 200 may progressively and incrementally move further downpath along the flight plan until identifying a waypoint where the associated constraints can be satisfied using the selected aircraft configuration.

After identifying the flight path segment 506 that is capable of satisfying the altitude constraint associated with the next downpath waypoint 412, the FMS 116 and/or the constraint management process 200 generates the graphical representations of the flight path segments 502, 504, 506 for the flight path segments of the modified flight path recommendation (e.g., using a visually distinguishable characteristic associated with the half speedbrake configuration) and renders the next downpath waypoint 412 using a visually distinguishable characteristic different from the specified downpath waypoint 410 to visually convey what the capability and limitation of the selected aircraft configuration of half speedbrakes is with respect to the requested constraint associated with the specified downpath waypoint 410.

As described above in the context of FIG. 3, the pilot may utilize the constraint management GUI display 500 to negotiate with the ATC regarding the requested altitude constraint for the downpath waypoint 410. For example, the pilot may request deviation from the altitude constraint at waypoint 410 but indicate that the aircraft can satisfy the altitude constraint associated with the next downpath waypoint 412, thereby providing the ATC with situational awareness of the aircraft's capabilities with respect to the pilot's objectives. Alternatively, the pilot may utilize the strategy selection GUI element 402 to select a different strategy to be utilized in order to achieve the requested constraint before accepting, confirming or otherwise responding to the ATC request. It should be appreciated that although the subject matter is described herein in the context of altitude constraints, the subject matter is not limited to altitude constraints and may be implemented in an equivalent manner for speed constraints or any other constraint to be satisfied by the aircraft at a particular point in space. In this regard, the subject matter described herein solves the problems of pilots or other vehicle operators lacking capability visualizations with respect to a requested constraint by providing guidance in a manner that reduces workload, reduces decision time and/or response time to address external requests, and improves the quality of decisions. As a result, safety, clearance compliance, trajectory management, operational efficiency and fuel management may be improved. The decision support may be particularly advantageous in single pilot or single user operations where workload and time are at a premium by reducing stress and maintaining operational safety.

For the sake of brevity, conventional techniques related to graphical user interfaces, graphics and image processing, air traffic control, aircraft procedures, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of an aircraft when a current energy state of the aircraft deviates from a reference energy state according to a flight plan, the method comprising:
   obtaining a requested energy constraint for a downpath waypoint from an air traffic controller (ATC), wherein the requested energy constraint comprises at least one of a requested altitude constraint and a requested speed constraint for the downpath waypoint;
   identifying an intermediate energy constraint for the aircraft at an intermediate point en route to the downpath waypoint between a current position of the aircraft and the downpath waypoint based at least in part on the flight plan, wherein the intermediate energy constraint comprises at least one of a first altitude and a first speed at the intermediate point;
   determining a first flight path segment from the current position of the aircraft to the intermediate point for satisfying the intermediate energy constraint at the intermediate point from the current energy state of the aircraft using a first aircraft drag configuration associated with the first flight path segment;
   determining a second flight path segment from the intermediate point to the downpath waypoint for satisfying the requested energy constraint associated with the downpath waypoint using a second aircraft drag configuration associated with the second flight path segment, wherein the second aircraft drag configuration is different from the first aircraft drag configuration; and
   providing graphical indicia of a recommended flight path comprising the first flight path segment and the second flight path segment, wherein the graphical indicia includes a first graphical indication of the first aircraft drag configuration associated with the first flight path segment and a second graphical indication of the second aircraft drag configuration associated with the second flight path segment.

2. The method of claim 1, wherein:
   the first aircraft drag configuration comprises a first speedbrake setting for the aircraft; and
   determining the second flight path segment comprises increasing a speedbrake setting for the aircraft to identify the second flight path segment that satisfies the requested energy constraint at the downpath waypoint.

3. The method of claim 1, wherein determining the second flight path segment comprises incrementally adjusting a drag configuration of the aircraft until identifying the second flight path segment that satisfies the requested energy constraint at the downpath waypoint.

4. The method of claim 3, wherein incrementally adjusting the drag configuration comprises incrementally increasing a speedbrake setting for the aircraft.

5. The method of claim 1, wherein:
   determining the first flight path segment comprises incrementally increasing a speedbrake setting of the aircraft from an initial state until identifying the first flight path segment that satisfies the intermediate energy constraint at the intermediate point using a first speedbrake setting; and
   the first aircraft drag configuration comprises the first speedbrake setting.

6. The method of claim 5, wherein determining the second flight path segment comprises incrementally increasing the speedbrake setting of the aircraft from the first speedbrake setting until identifying the second flight path segment that satisfies the requested energy constraint at the downpath waypoint using a second speedbrake setting; and
   the second aircraft drag configuration comprises the second speedbrake setting.

7. The method of claim 1, wherein:
   identifying the intermediate energy constraint for the aircraft comprises a speed constraint associated with the intermediate point between the current position of the aircraft and the downpath waypoint; and
   determining the first flight path segment for satisfying the intermediate energy constraint comprises optimizing a vertical profile between the current position and the intermediate point to satisfy the speed constraint at the intermediate point using the first aircraft drag configuration.

8. The method of claim 7, wherein:
   obtaining the requested energy constraint for the downpath waypoint comprises obtaining the requested altitude constraint for the downpath waypoint; and
   determining the second flight path segment comprises optimizing a second vertical profile between the intermediate point and the downpath waypoint to satisfy the requested altitude constraint at the downpath waypoint using the second aircraft drag configuration.

9. The method of claim 8, wherein determining the second flight path segment comprises incrementally adjusting a drag configuration of the aircraft from the first aircraft drag configuration to the second aircraft drag configuration when optimizing the second vertical profile between the intermediate point and the downpath waypoint using the first aircraft drag configuration fails to satisfy the requested altitude constraint at the downpath waypoint.

10. The method of claim 1, wherein providing the graphical indicia comprises:
    rendering a first graphical representation of the first flight path segment using a first visually distinguishable characteristic providing the first graphical indication of the first aircraft drag configuration associated with the first flight path segment; and
    rendering a second graphical representation of the second flight path segment using a second visually distinguishable characteristic providing the second graphical indication of the second aircraft drag configuration associated with the second flight path segment, wherein the first visually distinguishable characteristic and the second visually distinguishable characteristic are different.

11. The method of claim 1, wherein:
    the second flight path segment between the intermediate point and the downpath waypoint comprises a vertical profile configured to satisfy the at least one of the requested altitude constraint and the requested speed constraint at the downpath waypoint using the second aircraft drag configuration.

12. A non-transitory computer-readable medium having computer-executable instructions stored thereon that, when executed by a processing system, cause the processing system to:
  identify a requested energy constraint for a downpath waypoint, wherein the requested energy constraint comprises at least one of a requested altitude constraint and a requested speed constraint for the downpath waypoint received from an air traffic controller (ATC);
  identify an intermediate energy constraint at an intermediate point en route to the downpath waypoint between a current position of an aircraft and the downpath waypoint based at least in part on a planned route of travel for the aircraft, wherein the intermediate energy constraint comprises at least one of a first altitude and a first speed at the intermediate point;
  determine a first segment from the current position of the aircraft to the intermediate point for satisfying the intermediate energy constraint at the intermediate point from a current energy state using a first aircraft drag configuration for the aircraft;
  determine a second segment from the intermediate point for satisfying the requested energy constraint at the downpath waypoint using a second aircraft drag configuration for the aircraft vehicle different from the first aircraft drag configuration; and
  provide graphical indicia of a recommended path comprising the first segment and the second segment, wherein the graphical indicia includes a first graphical indication of the first aircraft drag configuration associated with the first segment and a second graphical indication of the second aircraft drag configuration associated with the second segment.

13. The computer-readable medium of claim 12, wherein the computer-executable instructions cause the processing system to determine the second segment by incrementally adjusting an aircraft drag configuration from the first aircraft drag configuration to the second aircraft drag configuration to arrive at the second segment when unable to determine the second segment satisfying the requested energy constraint from the intermediate point to the downpath waypoint using the first aircraft drag configuration.

14. The computer-readable medium of claim 12, wherein the first aircraft drag configuration comprises a first speedbrake setting for the aircraft and the second aircraft drag configuration comprises a second speedbrake setting for the aircraft, wherein the second speedbrake setting is greater than the first speedbrake setting.

15. The computer-readable medium of claim 12, wherein the computer-executable instructions cause the processing system to:
  identify the intermediate energy constraint by identifying a speed constraint associated with the intermediate point between the current position of the aircraft and the downpath waypoint; and
  determine the first segment from the current position to the intermediate point that satisfies the speed constraint at the intermediate point using the first aircraft drag configuration.

16. The computer-readable medium of claim 15, wherein the computer-executable instructions cause the processing system to determine the second segment from the intermediate point to the downpath waypoint that satisfies the requested energy constraint at the downpath waypoint using the second aircraft drag configuration.

17. A vehicle system comprising:
  a display device;
  one or more systems to provide current status information for an aircraft; and
  a processing system coupled to the display device and the one or more systems to:
    obtain a requested energy constraint for a downpath waypoint of a planned route of travel for the aircraft from an air traffic controller (ATC), wherein the requested energy constraint comprises at least one of a requested altitude constraint and a requested speed constraint for the downpath waypoint;
    identify an intermediate energy constraint at an intermediate point en route to the downpath waypoint between a current position of the aircraft and the downpath waypoint based at least in part on the planned route of travel, wherein the intermediate energy constraint comprises at least one of a first altitude and a first speed at the intermediate point;
    determine a first segment from the current position of the aircraft to the intermediate point for satisfying the intermediate energy constraint at the intermediate point based at least in part on the current status information using a first airbrake setting for the aircraft;
    determine a second segment from the intermediate point to the downpath waypoint for satisfying the requested energy constraint associated with the downpath waypoint using a second airbrake setting for the aircraft; and
    provide graphical indicia of a recommended path comprising the first segment and the second segment on the display device, wherein:
      the graphical indicia includes a first graphical indication of the first airbrake setting associated with the first segment and a second graphical indication of the second airbrake setting associated with the second segment; and
      the first airbrake setting is different from the second airbrake setting.

18. The vehicle system of claim 17, wherein:
  the second airbrake setting is greater than the first airbrake setting.

19. The vehicle system of claim 18, wherein the processing system determines the second segment by incrementally increasing the first airbrake setting to the second airbrake setting when the first airbrake satisfying is unable to satisfy the requested energy constraint associated with the downpath waypoint from the downpath waypoint.

20. The vehicle system of claim 19, wherein the processing system determines the first segment by optimizing a first vertical profile between the current position of the aircraft and the intermediate point to satisfy the intermediate energy constraint at the intermediate point using the first airbrake setting and determines the second segment by optimizing a second vertical profile between the intermediate point and the downpath waypoint to satisfy the requested energy constraint at the downpath waypoint using the second airbrake setting.

* * * * *